United States Patent

[11] 3,614,642

| [72] | Inventors | Urs Hochuli<br>Hyattsville;<br>Paul R. Haldemann, College Park, both of Md. |
|---|---|---|
| [21] | Appl. No. | 579,293 |
| [22] | Filed | Sept. 14, 1966 |
| [45] | Patented | Oct. 19, 1971 |
| [73] | Assignee | The University of Maryland<br>College Park, Md. |

[54] GAS LASER
10 Claims, 1 Drawing Fig.

[52] U.S. Cl. .................................................. 330/4.3,
29/25.17, 313/217, 313/218, 313/220, 331/94.5
[51] Int. Cl. ....................................................... H01s 3/22
[50] Field of Search.......................................... 330/4.3;
331/94.5; 313/110, 113, 185, 218, 226, 230, 311,
339, 352, 355, 356, 224, 210, 217, 211, 213;
29/25.17, 25.18, 106; 148/6.3

[56] References Cited
UNITED STATES PATENTS

| 1,932,025 | 10/1933 | Thomas | 313/213 X |
|---|---|---|---|
| 1,816,690 | 7/1931 | Moore | 313/311 X |
| 1,908,366 | 5/1933 | Kingsbury | 313/311 |
| 1,908,648 | 5/1933 | Spaeth | 313/311 X |
| 2,154,404 | 4/1939 | Killian | 313/356 |
| 3,122,702 | 2/1964 | Franken | 331/94.5 UX |
| 3,183,393 | 5/1965 | Paterson | 313/311 X |
| 3,242,439 | 3/1966 | Rigden et al. | 313/226 X |
| 2,060,358 | 11/1936 | Wisewood | 29/106 |
| 2,456,855 | 12/1948 | Arnott et al. | 313/224 X |

OTHER REFERENCES

Akitt et al., " Water Vapor Gas Laser Operating at 118-- Microns Wavelength," Proceedings of the IEEE, Vol. 54, No. 4, April, 1966; pp. 547– 551. Class 331- 94.5

Article in Metal Progress, July, 1948; page 41. Class 148–6.3

*Primary Examiner*—Raymond F. Hossfeld
*Attorney*—Hurvitz, Rose & Greene

ABSTRACT: A cold cathode gas laser, in which the cathode is machined in distilled water and is not chemically treated. before being oxidized, and in which gas pressure and volume and cathode current density are selected to provide cathode life of over 10,000 hours for a cathode so prepared.

PATENTED OCT 19 1971
3,614,642
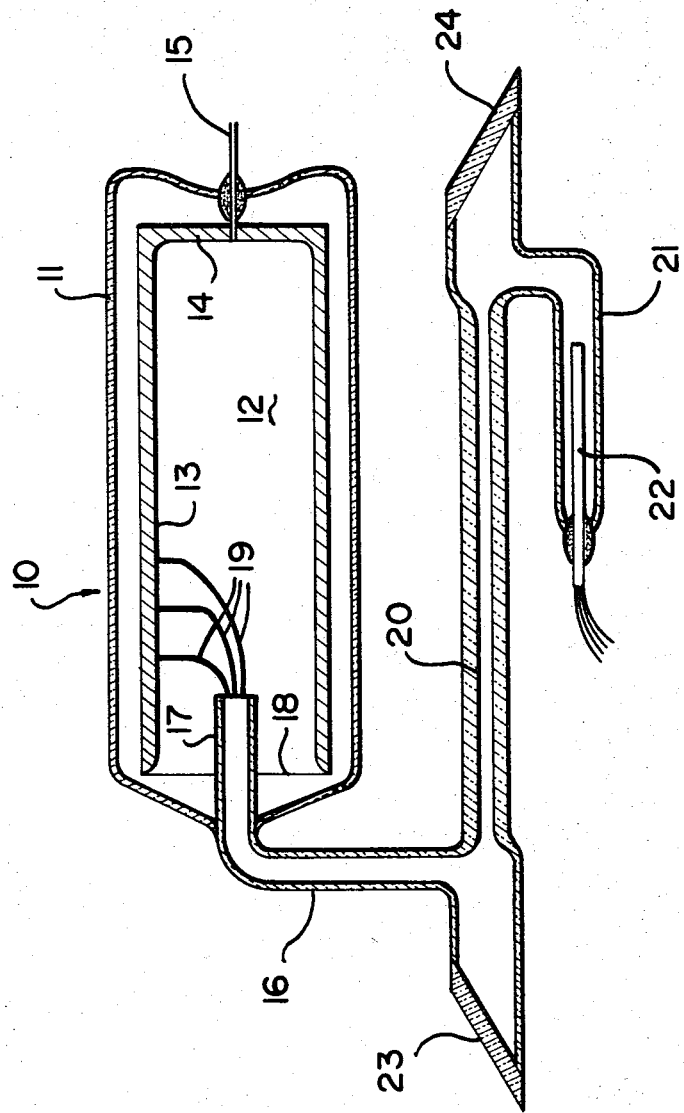
INVENTORS
URS HOCHULI and
PAUL R. HALDEMANN
BY *Hurvitz, Rose & Greene*
ATTORNEYS

GAS LASER

The present system relates generally to cold cathode lasers and to cathodes for He-Ne gas lasers, and more particularly to methods of operating and fabricating such cathodes and such lasers.

We have found that so long as maximum laser cathode current density is below about 0.6 ma./cm.$^2$, for a normal cathode drop, at any and every point of the laser-cathode, long laser life, over 10,000 hours can be attained, if a properly prepared cathode surface is available, employing aluminum, or beryllium, as a base metal. Alloys of these metals are included, since the commercial grades of aluminum used by us are not pure metals. Similarly, long life has been attained for magnesium at about 0.17 ma./cm.$^2$, with a gas pressure of 3 Torr. or less and a gas volume of about 50 cm$^3$.

The single frequency He-Ne gas laser can operate with He-Ne gas mixtures in the ratio range 5 to 1 to 15 to 1 under a total pressure of 3 Torr. or slightly less. With DC excitation the voltage drop across the 1 mm. capillary discharge tube of the laser, 5-7 cm. long, is then approximately 500.-700. v. for a total current of 5ma. Cold cathodes having a cathode drop of about 100. v. require only half a watt for the emission of 5 ma. For cathode diameters of 11.5 mm. and greater and a gas volume of about 50. cm.$^3$, a hollow cylindrical aluminum cathode according to the invention provides a life of over 11,000 hours. For a 7.0 mm. diameter life goes down to a few hundred hours, indicating the crucial dependence of life on cathode current density. The latter is the usual and normal life expectancy of laser cathodes, according to prior art for a gas volume of 50 cm$^3$.

Best results have been achieved with aluminum cathodes having an oxide coating. Tests indicate that beryllium and magnesium are effective, the latter not necessarily with a cathode current density of as much as 0.6 ma./cm.$^2$ for magnesium. All other metals usually considered available as laser cathodes do not have long life, i.e., BaO, Mo, Nb, Zr, Ni, Cu.

It is essential that the cathode surface be properly prepared. Chemical treatment of the surface poisons the surface, or, at least, no chemical treatment which has been attempted has failed to do so. Briefly described, according to the invention, the cathode surface is machined with distilled water as a lubricant, and is then rinsed with distilled water. Acetone can be used to remove grease, if necessary without deleterious effect.

While the present invention has been successfully tested, as applied only to He-Ne lasers, the principles of the invention are not limited to the gases specified. For example, $CO_2$ lasers can be constructed to operate with cathode current densities in the ranges specified for He-NE lasers, and our studies have led us to believe that the cathode of the invention is operative in $CO_2$ lasers, to provide long cathode life, if operated as specified for He-NE lasers. Still other gas combinations have been used in lasers, and the cathode of the present invention is believed applicable to these if operated at values of cathode current densities no greater than those specified for He-Ne lasers.

Lifetime of a laser is proportional to gas volume, and the specified figure of 50. cm.$^3$ is considered about minimum for gas volume from considerations other than lifetime alone, so that the present system enables use of a minimum gas volume and therefore a minimum laser bulk.

It is accordingly a broad object of the invention to provide a cold cathode gas laser having a long lived cathode, which may be specifically at least as long as 10,000 hours.

It is another object of the invention to provide methods of preparing long lived cathode surfaces for cold cathode gas lasers, and of operating such lasers.

It is another object of the invention to provide a novel He-Ne laser capable of operating for over 10,000 hours, which may utilize only about 50. cm.$^3$ of gas and which operates at pressures of about 3 Torr.

Another object of the invention resides in the provision of a cathode for a He-Ne laser, having long life at low gas pressures and gas volumes.

It is a further feature of the invention, to eliminate cyclotron or other plasma oscillations in lasers, since these deteriorate laser operation. In the case of the He-Ne laser these oscillations do not occur appreciably if gas pressure is 2.8 Torr. or below, a pressure range feasible in accordance with the present invention.

The above and still further objects, features and advantages of the present invention will become apparent upon consideration of the following detailed description of one specific embodiment thereof, especially when taken in conjunction with the accompanying drawings, wherein:

The single FIGURE of the drawings is a view in front section of a gas laser, employing the cathode of the invention.

Referring now more particularly to the FIGURE of the drawings, 10 is a quartz or glass envelope, including a cathode section 11. Within cathode section 11 is located a hollow cylindrical cold cathode 12 fabricated of metal having an oxide surface, and selected from among Al, Be, Mg. The inner surface 13 of the cathodic cylinder 12 constitutes the cathodic surface. The cathodic cylinder 12 is closed at one end, by a closure seat 14 and is open at the remaining end. To the closure plate is connected a cathode lead 15 which extends externally of the cathode section 11 via a suitable seal.

A narrow glass tube 16, forming part of the envelope 10, extends from the cathode section 11. An open end 17 of tube 16 extends well within the open end 18 of cathode 12, sufficiently so that when voltage is applied to the tube, the discharge will not derive from or near the edge of the cathode, thereby avoiding high current densities due to edge effects. Typical flow lines are shown at 19.

The tube 16 extends to an interposed capillary section 20, which terminates in an anode section 21. An anode 22 extends into the latter. A defined light beam path through the capillary section 20 is provided by transparent windows 23 and 24, and which are inclined at Brewster's angle to the path of the light beam.

The total gas volume of the enclosure 10 is about 50. cm$^3$, this being essentially near the minimum volume dictated by considerations of cathode life, such as mechanical considerations, desired light path length, required cathode dimensions, and the like. Pressure may be 3 Torr. or below. Decrease of pressure reduces life, so that pressures much below 3 Torr. are not recommended, but values sufficiently below 3 Torr. to assure negligible plasma oscillations can be utilized, i.e., 2.8 Torr.

The volume of the envelope 10 is about 50 cm$^3$. The inner diameter of the cathode 13 is 22 mm., providing a current density of 0.14 ma./cm$^2$. For these conditions a cathode life of well over 10,000 hours was observed.

A detailed method of outgassing the tube with an Al cathode is as follows: The fore pump is used to reduce the air pressure to about 2 Torr. The discharge tubes are then started and the current is adjusted to roughly 5-10 milliamperes per square centimeter active cathode area. This has to be done with a certain amount of care to avoid evaporation of the electrodes. The fore pump is used to keep pressure between 2 and 3 Torr., while the discharge is running. After 3 to 5 minutes, the tubes are turned off, pumped down with the fore pump and then refilled with air or $o_2$ to about 2 Torr., and turned on again.

Repeating this cycle 4 or 5 times leads finally to a stable pressure with the fore pump disconnected. After that the tubes are evacuated down to at least $10^{16}$ Torr. and further outgassed with a soft flame during this process.

The tubes are then filled with the He-Ne mixture and turned on again with a large current. As soon as the discharge turns blue the tubes are turned off, pumped down and refilled again. A few such cycles lead to a clean discharge with the characteristic orange He-Ne color. The tubes are then burned in with about twice the normal running current for 1 to 2 days before the final filling and sealing off takes place. These Al, Mg. or Be electrodes act as their own getter and no additional getter is used.

An essential feature involved in preparing the cathode is that it not be chemically treated. To this end it is machined with distilled water. Acetone may be used to clean the surface, but the surface may not be chemically treated in any way. Certainly, all of the many such treatments which we have observed have poisoned the cathode, but since possible chemical treatments are infinite, not all could have been tested.

Types of aluminum employed have been Types 1100; 6061; 2011; 7075 ; 2024. So far as is known any type of easily machinable aluminum of which the specified types are satisfactory, but not necessarily with the same ohm current density which applies to 2024-type aluminum. These three metals all oxidize readily in air, forming a very thin tough oxide film, and presence of such an oxide film is essential to success. Possibly chemical poisoning of the cathode surface prevents the formation of the proper oxide layer or renewal of the oxide surface as an existing surface is removed by bombardment during laser operation. The specified current density is presumed to be that which allows replenishment of the oxide layer or the oxide surfaces as rapidly as it is removed by the discharge, or forecloses its destruction by the discharge. Chemical treatment of the cathode probably prevents such replenishment or the initial formation of an oxide layer which is not readily removable.

The use of the cathodes above described have led not only to long lived lasers, but have also led to superior laser operation. So long as gas pressure in a He-Ne laser is slightly below 3 Torr., say about 2.8 Torr., plasma oscillations do not occur. These deteriorate laser operation. As pressure is reduced, however, gas clean-up due to sputtering increases, leading to shorter tube life.

It is an important feature of the present invention that it permits construction of a He-Ne laser having a gas volume of about 50. cm.$^3$ or less, which is capable of operating with an initial gas pressure of sufficiently less than 3 Torr. to eliminate plasma oscillations, and which has a life of over 10,000 hours, provided that no part of the cathode receives greater than a current density of about 0.6 ma./cm$^2$.

It has been found by chemical analysis that type 2024 Al contains the following impurities, by percent:

| | |
|---|---|
| Silicon | 0.23 |
| Manganese | 0.58 |
| Chromium | 0.015 |
| Iron | 0.29 |
| Titanium | 0.035 |
| Nickel | Nil |
| Copper | 4.55 |
| Magnesium | 1.78 |
| Zinc | 0.07 |

It therefore seems clear that purity of metal is not requisite but that commercial grades of metals are suitable.

Outgassing of beryllium has been successfully accomplished by simple bombardment in He-Ne gas mixture, leading to a cathode life of over 10,000 hours, so that the method of outgassing does not appear to be crucial.

We do not desire to be limited to any theory of operation, our results having been attained empirically.

The term "long life," in respect to a laser, implies that unacceptable gas pressure changes have not occurred.

The total axial length of the cylindrical cathode is equal to the glow length, such that normal cathode drop occurs, i.e., the cathode area is at least as great as the area of the glow for normal drop. To decrease length beyond this point increases cathode drop, which is deleterious, while increase of length beyond this point is useless, but not deleterious.

While we have described scribed and illustrated one specific embodiment of our invention, it will be clear that variations of the details of construction which are specifically illustrated and described may be resorted to without departing from the true spirit and scope of the invention as defined in the appended claims.

What we claim is:

1. A gas laser having a cold cathode, said cathode being fabricated of metal selected from among beryllium, aluminum and magnesium, said cathode comprising a layer of oxide formed on a chemically untreated surface of the metal which has been cleaned to remove chemical impurities by machining the surface metal therefrom.

2. The method of operating a cold cathode gas laser, comprising maintaining maximum cathode current density at below 0.6 milliamperes per square centimeter for normal cathode drop at all points of said cathode, said cathode being selected from among Al, Be and Mg and having an oxide film thereon formed over a chemically clean surface.

3. The method of fabricating a cylindrical cold cathode for a gas laser, comprising machining the interior cylindrical surface of said cathode with distilled water as lubricant, and cleaning said surface in such manner as to provide a chemically untreated discharge surface.

4. A gas laser, comprising
   an extended hollow cylindrical cold cathode,
   an anode,
   an insulating enclosure maintaining said cold cathode and said anode at a gas pressure of about 3 Torr.,
   said insulating enclosure including walls defining a capillary passage between said cathode and said anode, the inner surface of said cathode constituting a cathodic surface, said cathode being fabricated of metal and said cathodic surface having an oxide surface, said metal being selected from among Al, Be, Mg,
   means providing a defined light path along said capillary passage,
   transparent windows terminating said light path at the two ends of said light path,
   the total gas volume of said enclosure being about 50 cm.$^3$, and the physical parameters of said electrode and enclosure and the voltages applied to said electrodes being such that cathode current density is not greater than about 0.6 ma./cm$^2$.

5. The combination according to claim 4, wherein said pressure is about 2.8 Torr. to assure negligible plasma oscillations in said enclosure.

6. The combination according to claim 4, wherein said cathode current is below 0.2 ma./cm.$^2$ and said metal is magnesium.

7. The combination according to claim 4, wherein said pressure is substantially 2.8 Torr. and said current density is about 0.14 ma./cm$^2$.

8. The method of fabricating a gas laser, said gas laser comprising an extended hollow cylindrical cold cathode, an anode and an enclosure for said anode and cathode comprising the steps of machining the inner surface of said cathode with distilled water as a lubricant, repetitively forming a gas discharge between said cathode and anode while maintaining oxygen containing gas at a pressure of about 2–3 Torr. in said enclosure with gas outpumping between repetitions until stable gas pressure is achieved, and thereafter outgassing said enclosure to about 10$^{16}$ Torr. and filling said enclosure with a laser gas.

9. The combination according to claim 8, wherein said laser gas is He-ne and the filling occurs to about 3 Torr.

10. A gas laser, comprising:
    an extended hollow cylindrical cold cathode,
    an anode,
    an insulating enclosure maintaining said cold cathode and said anode at a gas pressure of about 3. Torr.,
    said insulating enclosure including walls defining a capillary passage between said cathode and said anode, the inner surface of said cathode constituting a cathodic surface, said cathode being fabricated of metal and said cathodic surface having an oxide surface, said metal being selected from among Al, Be, Mg,
    means providing a defined light path along said capillary passage,
    transparent windows terminating said light path at the two ends of said light path, the total gas volume of said enclosure being at least about 50 cm.$^3$, and the physical parameters of said electrode and enclosure and the voltages applied to said electrodes being such that cathode current density is not greater than about 0.6 ma./cm$^2$.